(12) United States Patent
Xie et al.

(10) Patent No.: US 12,094,088 B2
(45) Date of Patent: Sep. 17, 2024

(54) IMAGE ENHANCEMENT METHOD AND APPARATUS, AND COMPUTER-READABLE STORAGE MEDIUM

(71) Applicant: TENCENT TECHNOLOGY (SHENZHEN) COMPANY LIMITED, Guangdong (CN)

(72) Inventors: Zhihuai Xie, Guangdong (CN); Shan Liu, San Jose, CA (US); Songnan Li, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 413 days.

(21) Appl. No.: 17/452,679

(22) Filed: Oct. 28, 2021

(65) Prior Publication Data
US 2022/0051370 A1  Feb. 17, 2022

Related U.S. Application Data

(63) Continuation of application No. PCT/CN2020/119916, filed on Oct. 9, 2020.

(30) Foreign Application Priority Data

Dec. 19, 2019 (CN) .......................... 201911319915.8

(51) Int. Cl.
G06T 5/70 (2024.01)
G06T 5/20 (2006.01)
G06T 5/50 (2006.01)

(52) U.S. Cl.
CPC .................. G06T 5/70 (2024.01); G06T 5/20 (2013.01); G06T 5/50 (2013.01);
(Continued)

(58) Field of Classification Search
CPC .. G06T 5/002; G06T 5/20; G06T 5/50; G06T 2207/20024; G06T 2207/20216;
(Continued)

(56) References Cited

U.S. PATENT DOCUMENTS

2004/0175035 A1* 9/2004 Kameyama ............. G06T 7/215
382/284
2006/0125842 A1* 6/2006 Kim ....................... G06T 3/4015
345/611
(Continued)

FOREIGN PATENT DOCUMENTS

CN 101710415 A 5/2010
CN 104580831 A 4/2015
(Continued)

OTHER PUBLICATIONS

Sezn, M. I., A. M. Teklap, and Ralph Schaetzing. "Automatic anatomically selective image enhancement in digital chest radiography." IEEE Transactions on Medical Imaging 8.2 (1989): 154-162. (Year: 1989).*
(Continued)

*Primary Examiner* — Emily C Terrell
*Assistant Examiner* — Stefano Anthony Dardano
(74) *Attorney, Agent, or Firm* — ArentFox Schiff LLP

(57) ABSTRACT

An image enhancement method is provided. The method includes obtaining an image, extracting high-frequency components of the image, calculating an average pixel value of pixels corresponding to the extracted high-frequency components, and performing enhancement on pixels in the image that have pixel values greater than or equal to the calculated average pixel value to obtain an enhanced image. Apparatus and non-transitory computer-readable storage medium counterpart embodiments are also provided.

20 Claims, 10 Drawing Sheets

(52) U.S. Cl.
CPC .............. *G06T 2207/20024* (2013.01); *G06T 2207/20216* (2013.01); *G06T 2207/20224* (2013.01)

(58) Field of Classification Search
CPC .......... G06T 2207/20224; G06T 5/004; G06T 5/007; G06T 5/008
See application file for complete search history.

(56) References Cited

U.S. PATENT DOCUMENTS

| | | | |
|---|---|---|---|
| 2006/0245666 | A1 | 11/2006 | Petrosyan et al. |
| 2007/0081737 | A1* | 4/2007 | Lertrattanapanich ..... G06T 5/75 382/254 |
| 2012/0269414 | A1* | 10/2012 | Zha ........................... G06T 5/70 382/131 |
| 2014/0085507 | A1* | 3/2014 | Pillman .................. H04N 23/64 382/173 |

FOREIGN PATENT DOCUMENTS

| | | |
|---|---|---|
| CN | 104657941 A | 5/2015 |
| CN | 105469373 | 4/2016 |
| CN | 106296599 A | 1/2017 |
| CN | 107274365 A | 10/2017 |
| CN | 107767356 A | 3/2018 |
| CN | 108428215 A | 8/2018 |
| CN | 108717687 | 10/2018 |
| CN | 109146814 A | 1/2019 |
| CN | 109785264 A | 5/2019 |
| CN | 110136084 | 8/2019 |
| CN | 110298807 A | 10/2019 |
| CN | 111145114 | 5/2020 |

OTHER PUBLICATIONS

Cadena, Luis, Alexander Zotin, and Franklin Cadena. "Enhancement of medical image using spatial optimized filters and OpenMP technology." Lecture Notes in Engineering and Computer Science (2018). (Year: 2018).*
Klemm, Michael, et al. "Extending OpenMP* with vector constructs for modern multicore SIMD architectures." OpenMP in a Heterogeneous World: 8th International Workshop on OpenMP, IWOMP 2012, Rome, Italy, Jun. 11-13, 2012. Proceedings 8. Springer Berlin Heidelberg, 2012. (Year: 2012).*
Joseph, Justin, B. N. Anoop, and Joseph Williams. "A modified unsharp masking with adaptive threshold and objectively defined amount based on saturation constraints." Multimedia Tools and Applications 78 (2019): 11073-11089. (Year: 2018).*
Joseph, Justin, B. N. Anoop, and Joseph Williams. "A modified unsharp masking with adaptive threshold and objectively defined amount based on saturation constraints." Multimedia Tools and Applications 78.8 (2019): 11073-11089. (Year: 2019).*
International Search Report issued Jan. 13, 2021 in Application No. PCT/CN2020/119916. (6 pages).
Written Opinion issued Jan. 13, 2021 in Application No. PCT/CN2020/119916. (4 pages).
Kim Youngbae, et al. Dark Image Enhancement Based on Pairwise Target Contrast and Multi-Scale Detail Boosting; 2015 IEEE International Conference on Image Processing (ICIP), IEEE, 2015: 1404-1408.
Chinese Office Action issued Jun. 30, 2021 in Application No. 201911319915.8 with concise English translation. (14 pages).
Wubuli et al., "Remote sensing image enhancement based on Shearlet transform and unsharp masking," Computer Engineer and Design, Apr. 30, 2015, vol. 36 No. 4.
Jane et al., "Priority and Significance Analysis of Selecting Threshold Values in Adaptive Unsharp Masking for Infrared Images," 15th Conference on Microwave Techniques COMITE 2010, Jun. 7, 2010.

* cited by examiner

To-be-enhanced image

Processed image and filed on Dec. 19, 2019. The entire disclosures of the above-identified prior applications are incorporated herein by reference in their entirety.

IMAGE ENHANCEMENT METHOD AND APPARATUS, AND COMPUTER-READABLE STORAGE MEDIUM

RELATED APPLICATIONS

This application is a continuation application of International Application No. PCT/CN2020/119916, entitled "IMAGE ENHANCEMENT METHOD AND APPARATUS, AND COMPUTER-READABLE STORAGE MEDIUM" and filed on Oct. 9, 2020, which claims priority to Chinese Patent Application No. 201911319915.8, entitled "IMAGE ENHANCEMENT METHOD AND APPARATUS, AND COMPUTER-READABLE STORAGE MEDIUM" and filed on Dec. 19, 2019. The entire disclosures of the above-identified prior applications are incorporated herein by reference in their entirety.

FIELD OF THE TECHNOLOGY

This application relates to the field of image processing technologies, including an image enhancement method and apparatus, and a computer-readable storage medium.

BACKGROUND OF THE DISCLOSURE

With the increasing popularity of portable photographing devices, it is easy for people to capture images. However, due to the impact of a photographing environment or other factors, when the image definition is low, especially after an image is scaled or transmitted, edge details of the image become blurred, and the quality of the image is further reduced. Therefore, in order to improve the quality of the image, technicians generally use an image enhancement algorithm to process the image. The image enhancement algorithm is commonly used for adjusting image brightness, contrast, saturation, hue, and the like, to increase image definition and reduce image noise.

SUMMARY

Embodiments of this disclosure provide an image enhancement method and apparatus, and a computer-readable storage medium, to enhance image details to improve an image enhancement effect.

According to a first aspect, an embodiment of this disclosure provides an image enhancement method, including: (1) obtaining an image; (2) extracting high-frequency components of the image; (3) calculating an average pixel value of pixels corresponding to the extracted high-frequency components; and (4) performing enhancement on pixels in the image that have pixel values greater than or equal to the calculated average pixel value to obtain an enhanced image.

According to a second aspect, an embodiment of this disclosure provides an image enhancement apparatus, including processing circuitry configured to (1) obtain an image; (2) extract high-frequency components of the image; (3) calculate an average pixel value of pixels corresponding to the extracted high-frequency components; and (4) perform enhancement on pixels in the image that have pixel values greater than or equal to the calculated average pixel value to obtain an enhanced image.

According to a third aspect, an embodiment of this disclosure provides an electronic device. The electronic device includes an output device, an input device, a processor (processing circuitry), a transceiver, and a memory, and the output device, the input device, the processor, the transceiver, and the memory are connected to each other. The memory is configured to store a computer program that supports the electronic device to perform the method provided according to the first aspect. The transceiver is configured to receive information from an apparatus other than the image enhancement apparatus and transmit information to the apparatus other than the image enhancement apparatus. The computer program includes program instructions. The processor (processing circuitry) is configured to invoke the program instructions to perform the method according to the first aspect.

According to a fourth aspect, an embodiment of this disclosure provides a non-transitory computer-readable storage medium, the computer-readable storage medium storing a computer program, the computer program including program instructions, the program instructions, when executed by processing circuitry, causing the processing circuitry to perform the method according to the first aspect.

According to a fifth aspect, an embodiment of this disclosure provides a computer program product, the computer program product, when being run on a computer, causing the computer to perform the method according to the first aspect.

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

BRIEF DESCRIPTION OF THE DRAWINGS

To describe the technical solutions in the embodiments of this disclosure more clearly, the following briefly introduces the accompanying drawings for describing the embodiments. The accompanying drawings in the following description show only some embodiments of this disclosure, and a person of ordinary skill in the art may still derive other drawings from these accompanying drawings.

DESCRIPTION OF EMBODIMENTS

The technical solutions of this disclosure are clearly described below with reference to the accompanying drawings of this application. The described embodiments are merely some rather than all of the embodiments of this disclosure. All other embodiments obtained by a person of ordinary skill in the art based on the embodiments of this disclosure shall fall within the protection scope of this disclosure.

Figure 1:
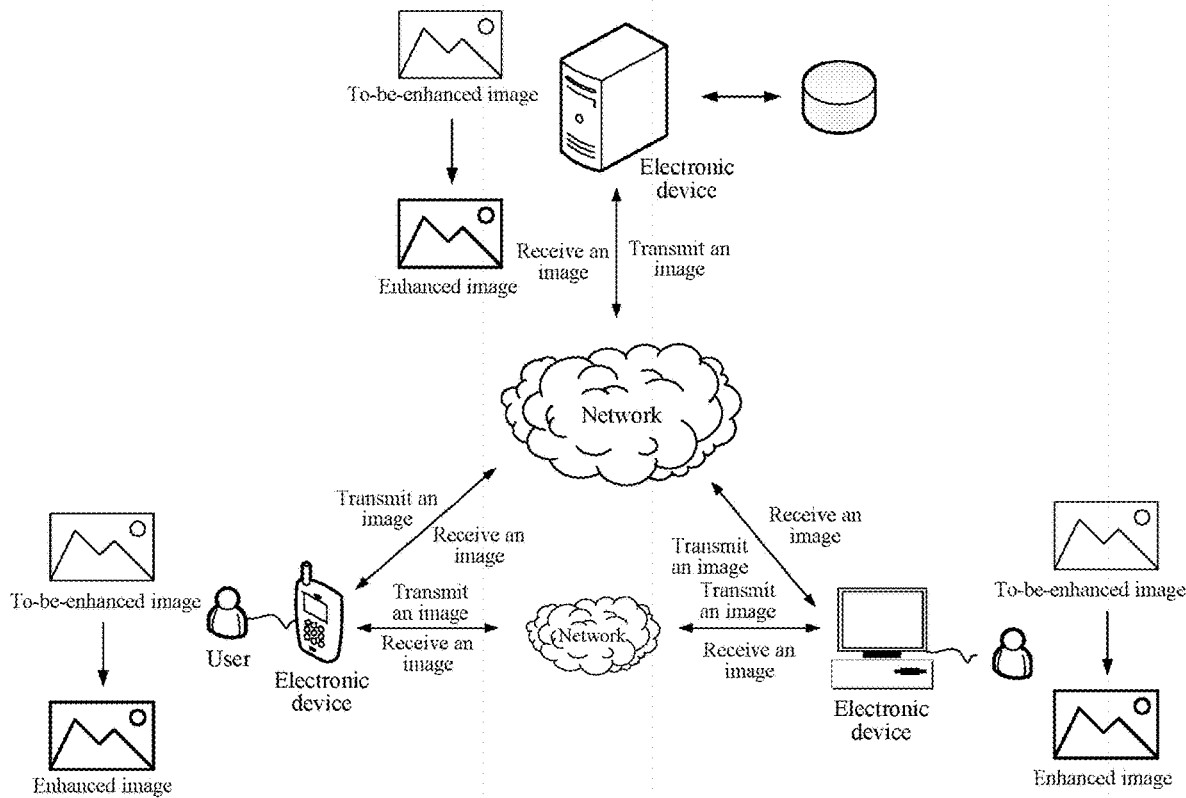
FIG. 1 is a schematic diagram of a system architecture of an image enhancement method according to an embodiment of this disclosure.

In order to better understand an image enhancement method and apparatus, and a computer-readable storage medium provided by the embodiments of this disclosure, the following first describes a system architecture used in the embodiments of this disclosure. FIG. 1 is a schematic diagram of a system architecture of an image enhancement method according to this disclosure. As shown in FIG. 1, the system architecture may include an electronic device used by a user, and one or more applications may be installed on the electronic device. One of the applications may perform enhancement on an image or a video to improve the definition of the image or an image in the video, and bring a better visual effect and viewing experience to the user. Image enhancement is to purposefully emphasize the overall or local features of an image, make an original unclear image clear or emphasize some features of interest, expand a difference between different object features in the image, suppress features not of interest, improve image quality, and enrich an amount of information. The foregoing electronic device can acquire an image (for example, receive, by using the Internet, an image transmitted by another electronic device), perform enhancement on the acquired/received image (for example, enhance details in the image) to obtain an enhanced image, and display the enhanced image on an output device (for example, a screen) included in the electronic device, or transmit the enhanced image to another device by using the Internet. It can be understood that the electronic device that performs enhancement on the image may be a sender of the image, or a receiver of the image. Alternatively, an electronic device of a sender may enhance the image and then transmit the image to an electronic device of a receiver. After receiving the enhanced image, the electronic device of the receiver further performs enhancement on the enhanced image and outputs the enhanced image after the further enhancement. The electronic device may include, but is not limited to a server, a desktop computer, a laptop computer, a smartphone, a tablet computer, a desktop computer, or the like. The user may call a corresponding application client to perform the image enhancement method according to an actual usage scenario. For example, the image enhancement method may be performed on an application client on which a video conference needs to be held, so that the image quality and definition of the video are improved, and the visual experience of a video receiver is improved.

Figure 2:
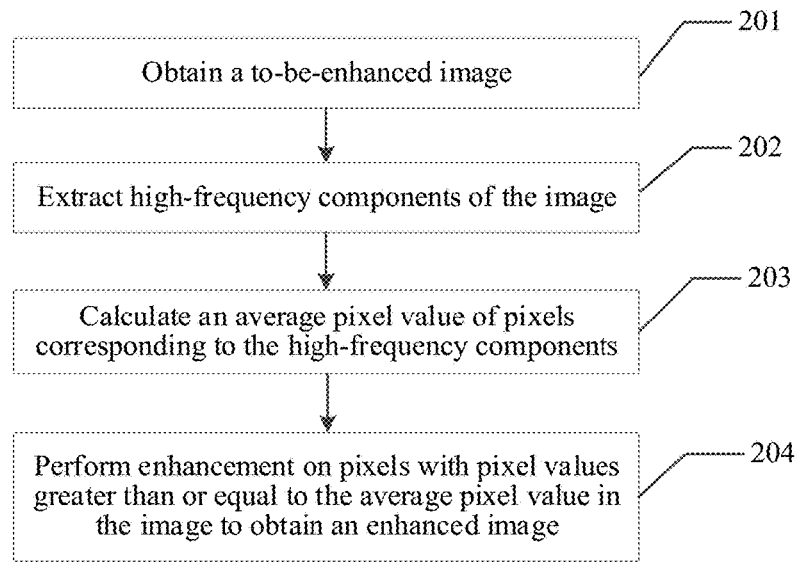
FIG. 2 is a schematic flowchart of an image enhancement method according to an embodiment of this disclosure.

FIG. 2 is a schematic flowchart of an image enhancement method according to an embodiment of this disclosure. The method in FIG. 2 may be applied to the electronic device shown in FIG. 1, and includes the following processing steps.

In step 201, a to-be-enhanced image is obtained.

Specifically, before an image is enhanced, the electronic device may obtain a to-be-enhanced image. A manner of obtaining the to-be-enhanced image may be that the electronic device obtains an image stored locally, or the electronic device receives an image transmitted by another electronic device, or the electronic device may capture one or more frames of images from an obtained or received video. The size of the image or an image included in a video is not limited and may be an image of any size or a video including an image of any size. In the method of this embodiment, enhancement may be performed on each frame of the video, so as to improve the definition of the video.

In step 202, high-frequency components of the image are extracted.

Specifically, extracting the high-frequency components of the image may include: first performing smooth filtering on the image to obtain a filtered image, and then performing a subtraction operation on the image (original image) and the filtered image to obtain the high-frequency components of the image. Performing a subtraction operation on the image and the filtered image is equivalent to respectively subtracting pixel values of pixels in the image from pixel values of corresponding pixels in the filtered image. The pixels in the image may also be represented by positions of the pixels in the image. In this disclosure, operation processing is performed on the pixel values of the image (including performing a subtraction operation), which may be separately processing an R channel, a G channel, and a B channel in an RGB image, or may be separately processing a Y component, a U component, and a V component in a YUV image. Smooth filtering may be performed on the image by using linear filtering such as mean filtering, Gaussian filtering, box filtering, or the like, or by using non-linear filtering such as median filtering, bilateral filtering, or the like. A filtering manner is not limited in this disclosure. A single channel or a plurality of channels of the image are filtered in the foregoing filtering manner to obtain a blurred image. Next, the blurred image is subtracted from the original image to obtain the high-frequency components of the to-be-enhanced image. If src(i) is the to-be-enhanced image, blur(i)

is a blurred image obtained after smooth filtering is performed on the to-be-enhanced image, and the high-frequency component of the to-be-enhanced image may be mask(i)=src(i)−blur(i). The high-frequency component herein is also an extracted image mask. It can be understood that the image enhancement method provided in this disclosure is to enhance details in the image, and the high-frequency components of the image correspond to a sharply changed part of the image, that is, the edge (contour) or details of the image. Therefore, the enhanced image is obtained through the processing of the high-frequency components.

In one implementation, Gaussian filtering is used as an example. The Gaussian filtering is a linear smooth filtering, is applicable to the elimination of Gaussian noise, and is widely applied to a noise reduction process in image processing. Gaussian filtering is a process of performing weighted averaging on pixel values of pixels in an entire image. A pixel value corresponding to each pixel after Gaussian filtering is obtained by performing weighted averaging on the pixel value of the pixel and another pixel value in a neighborhood. A specific process includes scanning each pixel in the image by using a template (or a convolution kernel), replacing a pixel value of a pixel corresponding to a weight of a center of the convolution kernel in the image with a weighted average value of the convolution kernel and a pixel value of a pixel corresponding to a weight of the convolution kernel in the image, to obtain a Gaussian filtered image. That is, a convolution operation is performed on the to-be-enhanced image and a preset Gaussian kernel to obtain a Gaussian filtered image. The Gaussian kernel (Gaussian convolution kernel) may be calculated through a Gaussian function. The Gaussian kernel may be a 3×3 matrix or a 5×5 matrix, which is not limited herein. Different convolution kernels may be selected according to requirements of actual application scenarios.

Figure 3A:
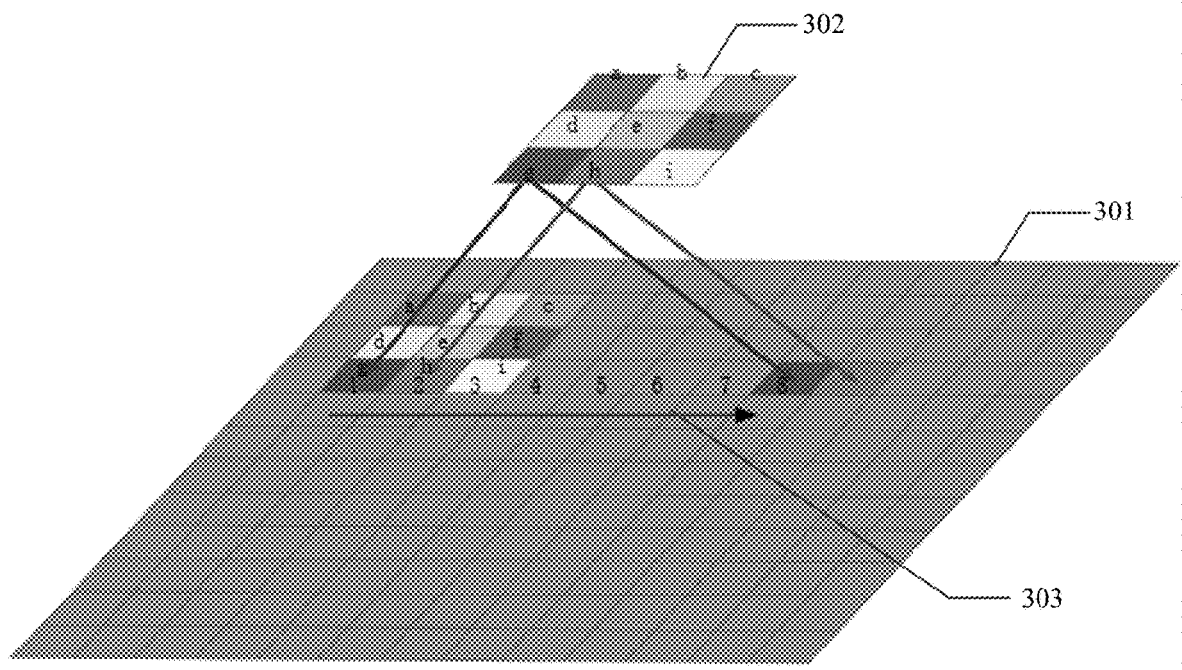
FIG. 3a is a schematic diagram of reading a data stream by using linear filtering according to an embodiment of this disclosure.
Figure 3B:
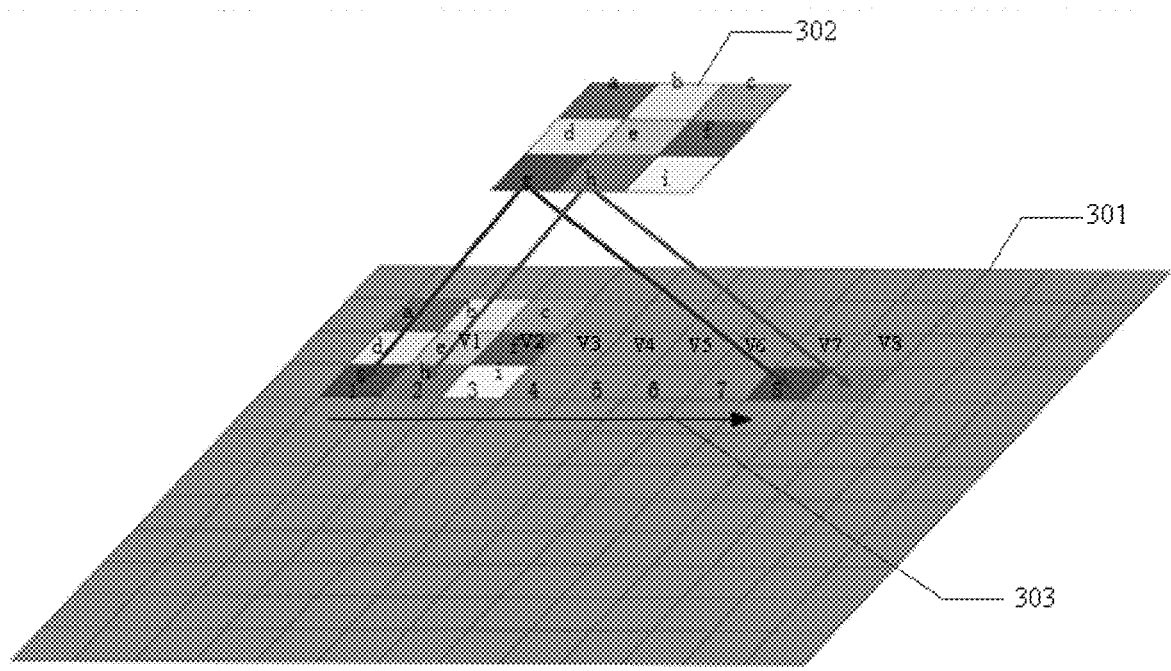
FIG. 3b is a schematic diagram of reading a data stream by using linear filtering according to an embodiment of this disclosure.

Further, a calculated convolution kernel is used as a fixed template to perform a convolution operation. In this embodiment, the electronic device may use single instruction multiple data (SIMD) to accelerate a convolution operation, and the SIMD is a technology that uses one controller to control a plurality of controllers and simultaneously performs the same operation on a group of data to achieve spatial parallelism. Referring to FIG. 3a and FIG. 3b, FIG. 3a is a schematic diagram of reading a data stream by using linear filtering according to an embodiment of this disclosure.

FIG. 3a includes an image 301 and a 3×3 convolution kernel 302. A matrix of the convolution kernel 302 is located above the image 301. When data is read in traditional convolution, as shown in FIG. 3a, a weight a in the convolution kernel 302 is multiplied by a pixel value corresponding to a pixel a in the image 301, a weight b in the convolution kernel 302 is multiplied by a pixel value corresponding to a pixel b in image 301, and a weight c in the convolution kernel 302 is multiplied by a pixel value corresponding to a pixel c in the image 301, and so on. That is, a pixel value of each pixel is respectively multiplied by a weight corresponding to the pixel, and the weights are averaged to obtain a pixel value corresponding to a center point, that is, a pixel value corresponding to a pixel e in the image 301. It can be understood that when the data is read, an operation is performed each time a pixel value is read.

In this embodiment of this disclosure, the electronic device reads N pixel values corresponding to a weight or a value in the convolution kernel at a time for operation, that is, reads N pieces of data at a time for operation to obtain N corresponding results. N is an integer greater than 1, and is generally 8 or 16. For example, a weight g in the convolution kernel 302 may correspond to a pixel g in the image 301. The electronic device may read, according to a scanning order of a row from left to right, N pieces of data at a time starting from the pixel g. N in this embodiment of this disclosure is 8. As shown in FIG. 3a, the electronic device may read data of 8 pixels (pixel values of pixels corresponding to numbers 1 to 8 in FIG. 3a) that start from the pixel g and are in the same row as the pixel g in a direction indicated by an arrow 303 in the image at a time, and separately multiplies the pixel values by the weight g in the convolution kernel to obtain 8 calculation results. Alternatively, data of 8 pixels that start from the pixel g corresponding to the weight g in the convolution kernel 302 and that are in the same column as the pixel g may be read. In this way, SIMD may be used, and after a weight of each of 9 positions in the convolution kernel in the figure is read once, 8 convolution results can be calculated. Next, pixel values V1 to V8 of the center point in the image 301 (as shown in FIG. 3b, which are equivalent to pixel values of the center pixel that are obtained by moving the convolution kernel 302 in FIG. 3a and FIG. 3b to the right 8 times from a position shown the figure) can be calculated based on a total of 72 convolution results corresponding to all the 9 positions. Compared with a traditional manner of reading data in which an operation is performed each time a piece of data of the convolution kernel is read, in this embodiment, each time the data is read, N operations can be performed, which improves the processing efficiency to N times the original processing efficiency. It is quite time-consuming for the electronic device to access a memory to read values. The method of this disclosure can reduce memory access times and improve the processing efficiency.

Further, because the width and height of the image are not necessarily an integer multiple of 8, the electronic device may determine, after each time performing the foregoing processing by using the convolution kernel, whether remaining pixels in the image are enough to perform the foregoing convolution calculation, and if the remaining pixels in the image are not enough to perform the foregoing convolution calculation, the electronic device may read and calculate pixel values of the remaining pixels in the traditional manner of reading data. It can be understood that, the linear filtering method such as mean filtering or Gaussian filtering has a fixed convolution kernel, and therefore, this embodiment of this disclosure is also applicable to a filtering manner with a fixed convolution kernel.

Further, weights in the Gaussian kernel are mostly floating point numbers less than 1, as shown in matrix (1):

$$\begin{vmatrix} 0.0453542 & 0.05664060 & 0.0453542 \\ 0.0566406 & 0.0707355 & 0.0566406 \\ 0.0453542 & 0.0566406 & 0.0453542 \end{vmatrix} \quad (1)$$

Because performing floating-point calculations reduces efficiency, the floating-point numbers in the Gaussian kernel may be transformed into integers first to obtain a quantified Gaussian kernel, and the quantified Gaussian kernel is then used for performing convolution operations. After the convolution operations are completed, a division operation is then performed on results of the convolution operations to obtain a final convolution result. The quantization may be multiplying the floating-point numbers in the Gaussian kernel by $2^n$ (n is an integer and may be equal to 8 or 16 herein) to obtain integers. The multiplication operation and the division operation refer to shift operations in binary operations. In this method, the overall operation efficiency of the electronic device can be improved. The Gaussian kernel is only used as an example. When weights in various convolution kernels are floating-point numbers, this method can be used to improve the operation efficiency.

Therefore, the performing smooth filtering on the image may include: (1) respectively reading weights in a filter convolution kernel by using SIMD, and multiplying each weight of the weights by pixel values of N consecutive pixels starting from a pixel corresponding to the weight in the image to obtain N multiplication results, N being an integer greater than 1; and (2) calculating convolution results of N consecutive pixels starting from a pixel corresponding to a center of the convolution kernel in the image according to multiplication results calculated through each weight in the filter convolution kernel.

According to this disclosure of this application, the filter convolution kernel is a Gaussian convolution kernel, and before the multiplying each of the weights by pixel values of N consecutive pixels starting from a pixel corresponding to the weight in the image, the method further includes: (1) performing a multiplication operation on a weight in the Gaussian convolution kernel and $2^n$, to quantify the weight in the Gaussian convolution kernel, n being an integer; and (2) performing a division operation on the convolution results of the N consecutive pixels after the convolution results of the N consecutive pixels are obtained, the multiplication operation and the division operation referring to shift operations in binary operations.

In step 203, an average pixel value of pixels corresponding to the high-frequency components is calculated.

Specifically, after the image mask is obtained in the manner described in step 202, in order to avoid a cumbersome manual parameter setting and parameter adjustment process which complicates the image processing, this embodiment does not adopt a fixed threshold, but performs adaptive enhancement according to different images. According to this embodiment, details of the image that need to be enhanced are determined according to a calculated threshold rather than a preset threshold and are then enhanced.

In this embodiment, the image mask corresponding to the extracted high-frequency components is traversed to obtain pixel values of pixels in the image mask and a quantity of the pixels, and calculate the threshold according to the obtained pixel values and the quantity of the pixels. In this embodiment, the high-frequency components, that is, the image mask, are obtained through subtraction. Therefore, the pixel values in the image mask may include positive and negative values. In this way, when the threshold is calculated, absolute values of pixel values in an image mask may be obtained, so that the absolute values of the pixel values of the pixels in the foregoing image mask are obtained. For pixels with pixel values as 0, it is determined that the pixels are in a flat region in the image. That is, the pixels are not in details in the image, the region needs to be reserved, and no enhancement is needed. For an edge region in which pixel values are not zero in the image mask, an average pixel value is calculated according to a sum of absolute values of the pixel values and a quantity of corresponding pixels, and the average pixel value is used as a threshold to determine whether enhancement is needed. That is, T=M/N, where T is a threshold T for detail enhancement, and also a calculated average pixel value, M is a total pixel value in the image mask, and the total pixel value is a sum of accumulating absolute values of pixel values with the absolute values greater than 0 in the image mask, N is a quantity of pixels with absolute values of pixel values that are obtained when the pixels in the image mask are traversed greater than 0.

In step 204, enhancement on pixels with pixel values greater than or equal to the average pixel value in the image is performed to obtain an enhanced image.

Specifically, after the average pixel value (the threshold T) is obtained, all the pixel values in the image mask are traversed, and an absolute value of each pixel value is compared with the average pixel value. When it is determined that an absolute value of a specific pixel value is greater than or equal to the average pixel value, it is determined that a pixel corresponding to the pixel value needs to be enhanced, and when it is determined that the absolute value of the pixel value is less than the average pixel value, it is determined that the pixel corresponding to the pixel value does not need to be enhanced.

When enhancement is performed on a pixel in the image that needs to be enhanced, an enhancement coefficient $\lambda$ may be obtained first, wherein $\lambda$ is an enhancement amplitude to control an output. Technicians may make settings according to actual application scenarios. When $\lambda$ is set to 0, there is no enhancement effect. Therefore, a value of $\lambda$ can be greater than 0. It can be understood that a larger value of $\lambda$ indicates a more obvious enhancement effect. After a value of the enhancement coefficient is determined, a formula dst(i)=src(i)+$\lambda$mask(i) can be used for enhancing the pixel that needs to be enhanced, where dst(i) is the enhanced image, src(i) is the to-be-enhanced image, and mask(i) is the extracted high-frequency components. Using a pixel value of a pixel (pixel position) as an example, dst(i) is a pixel value after enhancement, src(i) is a pixel value corresponding to the pixel in the to-be-enhanced image, and mask(i) is a pixel value of the pixel corresponding to the extracted high-frequency component (which is obtained by performing subtraction after filtering). It is to be learned that because a value of mask(i) may be positive or negative, a calculated pixel value of the pixel after enhancement may exceed 255 or may be less than 0. The electronic device may set the pixel value of the pixel to 255 when the calculated pixel value of the pixel after enhancement is greater than or equal to a first threshold, that is, 255. If the calculated pixel value of the pixel after enhancement is less than a second threshold, that is, 0, the pixel value of the pixel is set to 0. If the calculated pixel value after enhancement is between 0 and 255 (greater than or equal to 0 and less than 255), the calculated pixel value after enhancement is used as the pixel value of the pixel after enhancement, and the enhanced image is obtained after all the pixels are processed.

Therefore, step 204 may include the following steps: (1) obtaining an enhancement coefficient; (2) calculating, according to the enhancement coefficient when an absolute high-frequency component corresponding to a second pixel is greater than or equal to the average pixel value, a pixel value of an enhanced pixel that corresponds to the second pixel and that is in the image, the second pixel being any one of the pixels corresponding to the high-frequency components; (3) determining a first threshold as the pixel value of the enhanced pixel when the calculated pixel value of the enhanced pixel is greater than or equal to the first threshold; (4) determining a second threshold as the pixel value of the enhanced pixel when the calculated pixel value of the enhanced pixel is less than the second threshold, the second threshold being less than the first threshold; and (5) determining the calculated pixel value of the enhanced pixel as the pixel value of the enhanced pixel when the calculated pixel value of the enhanced pixel is greater than or equal to the second threshold and less than the first threshold.

In one example, the first threshold is 255, and the second threshold is 0.

Furthermore, after the details are enhanced, the image may be corrected to correct image aliasing caused by enhancement of the image details, so that after the image details are enhanced, smoothly transitioned pixels can be retained to maintain a smooth state.

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

Figure 4:
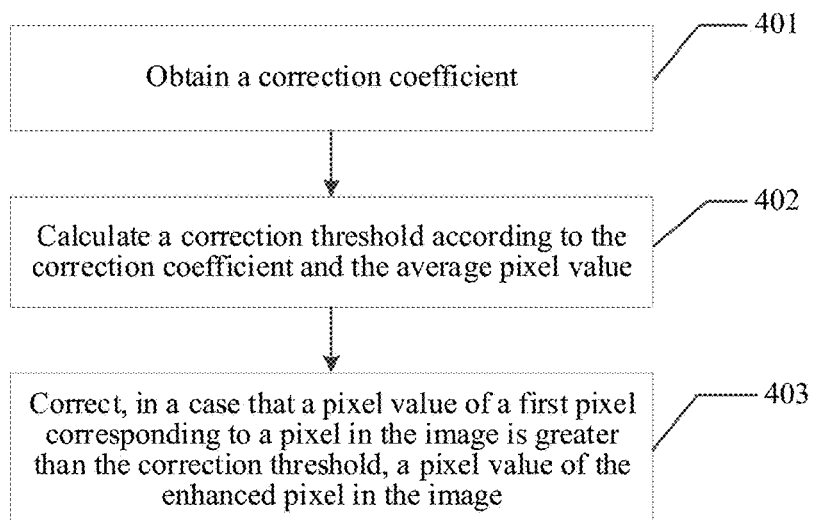
FIG. 4 is a schematic flowchart of another image enhancement method according to an embodiment of this disclosure.

FIG. 4 is a schematic flowchart of another image enhancement method according to an embodiment of this disclosure. The method in FIG. 4 can be used in combination with the method in FIG. 2. The method shown in FIG. 4 may include the following steps.

In step 401, a correction coefficient is obtained.

In one implementation, when details in the image are enhanced, pixel values of an edge part are enhanced by the sharpening of the image. In this case, it is easy to cause aliasing. From the subjective visual experience, the edge part of the image has abrupt aliasing. The reason is that there seems to be no abrupt aliasing from subjective vision is a smooth transition between pixel values, and some pixels with relatively small pixel values are compensated on the edge part to form a gradient effect. However, such pixel values having a smoothing effect are easy to be enhanced by the sharpening, which leads to disappearance of a transition effect. Therefore, the aliasing correction in the image enhancement method of this disclosure is exactly to maintain such pixel values having a smoothing effect and prevent the pixel values from being changed due to the foregoing enhancement.

Therefore, such pixel values (pixel values that needs to be corrected) are selected before correction is performed. For example, a correction threshold may be calculated based on the foregoing average pixel value (the threshold T) and the correction coefficient. The correction threshold is used for determining whether an enhanced pixel value needs to be corrected.

The correction coefficient $\alpha$ is, for example, a correction coefficient set by a technician according to a visual effect. A value of $\alpha$ may be any value between 3 and 8 and may be an integer or a decimal, which is not limited herein.

In step 402, a correction threshold is calculated according to the correction coefficient and the average pixel value.

In one implementation, a calculation manner of the correction threshold S may be S=$\alpha$ T, where $\alpha$ is the correction coefficient and T is the average pixel value. For example, in this embodiment, a value of $\alpha$ may be 4, and S=4 T. It can be understood that in this case, the correction threshold is four times the average pixel value.

In step 403, when a pixel value of a first pixel corresponding to a pixel in the image is greater than the correction threshold, a pixel value of the enhanced pixel in the image is corrected. The first pixel is a pixel in the pixels corresponding to the high-frequency components.

In one implementation, when the pixel value of the first pixel is greater than the correction threshold, the pixel value of the enhanced pixel is corrected. The first pixel may refer to a specific pixel position. The original image, the mask image, and the enhanced image may have the pixel position, and the pixel position may be distinguished by using different names.

In one implementation, it is determined whether the pixel value corresponding to the first pixel point (not an absolute value of the pixel value) is greater than the correction threshold. if the pixel value is greater than the correction threshold, the pixel value of the enhanced pixel that corresponds to the first pixel and that is in the image is corrected, and is restored to a pixel value before the pixel is enhanced. Finally, an outputted pixel value of the pixel is: dst(i)=src(i)·src(i) represents an original pixel value, that is, a pixel value when the pixel has not been enhanced, or a pixel value corresponding to the pixel in the to-be-enhanced image.

In one implementation, when the image is processed, there are two operation methods.

The first operation method is to perform enhancement on the entire to-be-enhanced image first, that is, to determine and select, based on the calculated average pixel value, the pixel values that need to be enhanced, and perform enhancement on the selected pixel values, to obtain the enhanced image, and then determine the correction threshold according to the average pixel value and the correction coefficient, and select, according to the correction threshold, the pixel values that need to be corrected and correct the pixel values, that is, restore the pixel value of the pixel that needs to be corrected to the pixel value before the pixel is enhanced, to obtain the final enhanced image.

The second operation method may be to first calculate the average pixel value and correction threshold according to the to-be-enhanced image. When a pixel value is processed, selection is first performed according to the average pixel value, to determine whether the pixel value needs to be enhanced. When it is determined that enhancement is needed, the pixel value is enhanced. After the pixel value is enhanced, the next pixel value is not determined immediately, but it is further determined whether the pixel value needs to be corrected. When it is determined that the pixel value needs to be corrected, the pixel value is restored to a pixel value before enhancement. When it is determined that the pixel value does not need to be corrected, the pixel value after enhancement is retained. An operation on the next pixel is then performed. In this embodiment, the second operation method is adopted, and an operation on a next pixel value can be performed after an operation of a current pixel value is completed (after the pixel value is corrected).

Figure 5:
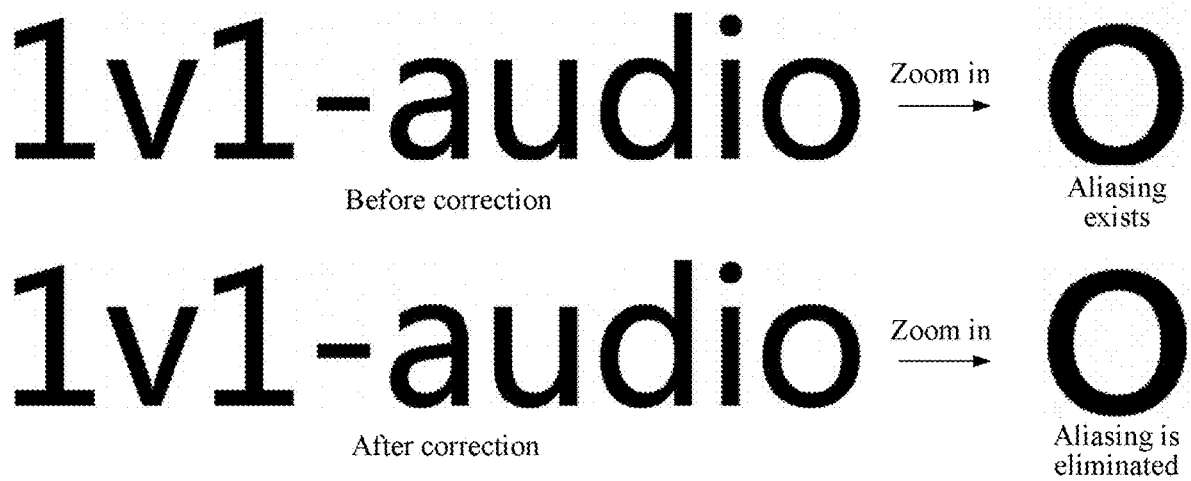
FIG. 5 is a schematic diagram of effect comparison of still another image enhancement according to an embodiment of this disclosure.

Reference may be made to FIG. 5 for an effect of aliasing correction. FIG. 5 is a schematic diagram of effect comparison of image enhancement according to an embodiment of this disclosure. The figure shows the elimination of aliasing in an image. As shown in FIG. 5, the image includes words "1v1-audio". If the letter "o" is zoomed, the letter "o" before correction has obvious aliasing, while in a corrected image, the aliasing is eliminated, and an edge becomes smooth. Through the image enhancement method of this embodiment of this disclosure, some pixels at the edge of the image may be prevented from being over-enhanced, thereby avoiding the amplification of noise in the image and the introduction of noise. For a corrected part, an original pixel value is maintained, which is to maintain original smoothness, that is, avoid a case that aliasing is introduced to destroy the subjective feeling of an overall picture, and improve the aesthetics of the picture. It can be seen that the image enhancement method provided in this disclosure is an end-to-end processing process without training or manual setting of a large quantity of parameters. The calculated average pixel value and correction threshold are used to replace a manual parameter adjustment process. Adaptive mechanism and aliasing correction are adopted, so that the image enhancement method provided in this disclosure is applicable to various scenarios.

Using the second operation method as an example, pseudo code of the image enhancement method of this disclosure may be:

```
input: to-be-enhanced image src, size of the image src.length, image mask, space dst
    for storing an outputted image
    output: enhanced image dst
    function DETAILENHANCE(src, dst, mask, src.length)    //define keywords of an
enhancement function
        for i=0 to src.length do    //loop through pixel values of pixels in the
to-be-enhanced image
            if abs(mask(i)) < T then    //determine whether an absolute value of a pixel
value of the pixel in the image mask is less than an average pixel value T
                dst(i) = src(i)//when the absolute value of the pixel value in the image
mask is less than the average pixel value T, skip performing enhancement on the pixel value of the
pixel
            else
                dst(i) = src(i) + λmask(i)//when the absolute value of the pixel value in
the image mask is greater than or equal to the average pixel value T, perform enhancement on the
pixel value of the pixel
                if dst(i) >= 255 then    //determine whether a pixel value of the
enhanced pixel is within an interval of 0 to 255, if the pixel value is greater than 255, the value of
the pixel is 255
                    dst(i) = 255
                end if
                if dst(i) < 0 then    //if the pixel value of the enhanced pixel is less
than 0, the value of the pixel is 0
                    dst(i) = 0
                end if
                if (src(i) – blur (i) > S) then//determine whether the pixel value of the pixel
in the image mask is greater than a correction threshold S
                    dst(i) = src(i)//if the pixel value in the image mask is greater than the
correction threshold S, perform aliasing correction
                end if
            end if
        end for
        return dst
    end function
```

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

Figure 6A:
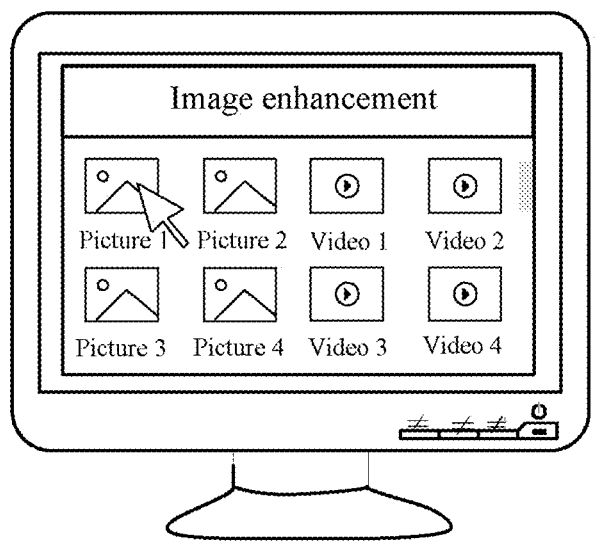
FIG. 6a is a diagram of an application scenario of an image enhancement method according to an embodiment of this disclosure.
Figure 6B:
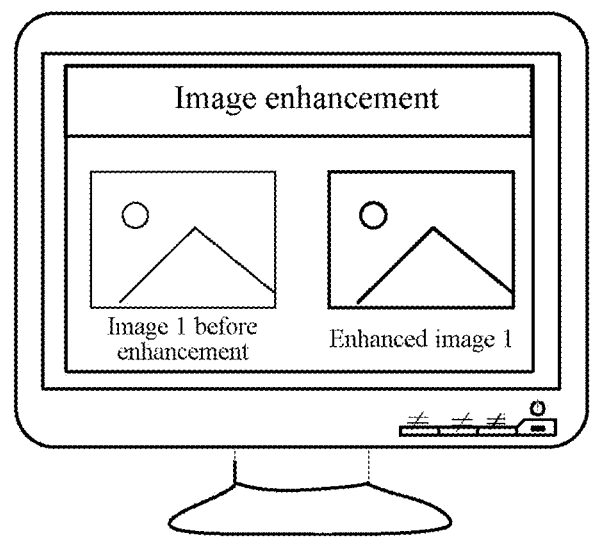
FIG. 6b is a diagram of an application scenario of an image enhancement method according to an embodiment of this disclosure.
Figure 6C:
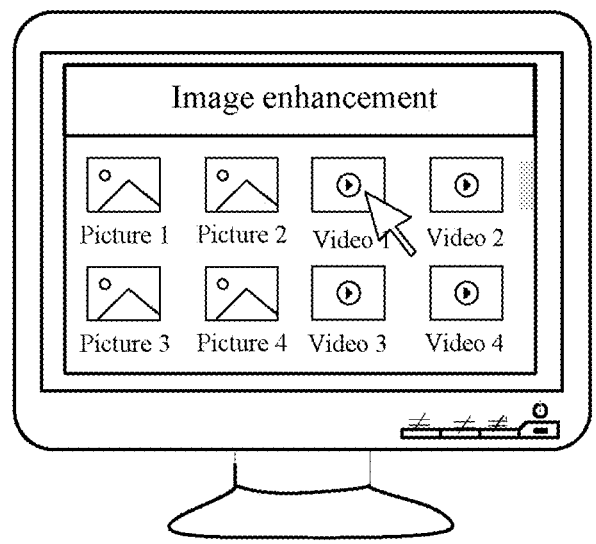
FIG. 6c is a diagram of an application scenario of an image enhancement method according to an embodiment of this disclosure.
Figure 6D:
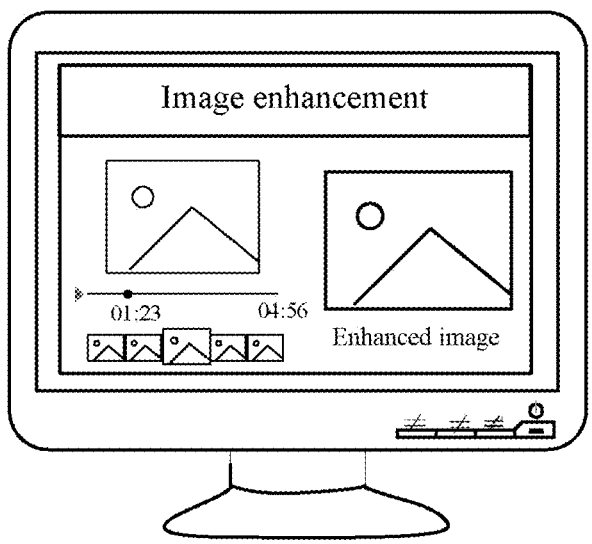
FIG. 6d is a diagram of an application scenario of an image enhancement method according to an embodiment of this disclosure.
Figure 6E:
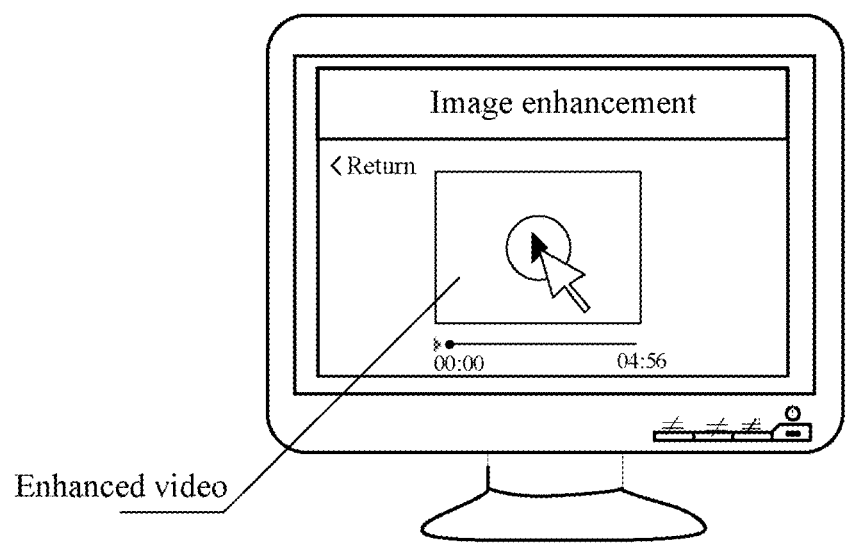
FIG. 6e is a diagram of an application scenario of an image enhancement method according to an embodiment of this disclosure.

FIGS. 6a to 6e are respectively diagrams of an application scenario of an image enhancement method according to embodiments of this disclosure. As shown in FIG. 6a, this embodiment may be applied to an electronic device. The application of this method includes two parts: (1) enhancing details of an image, and (2) enhancing frames of images included in a video, to obtain an enhanced video. The source of the image or the video may be an acquired image or video. After the image is selected to be enhanced, the method is applied to select, enhance, and correct pixel values to be enhanced, to obtain an enhanced image. As shown in FIG. 6b, an image before enhancement and an enhanced image can be displayed simultaneously in the electronic device, and the two are displayed for comparison. For each frame in the video, as shown in FIG. 6c, after the video is selected to be enhanced, the electronic device may display an image corresponding to a current frame of the video, a playback progress bar of the video, and images corresponding to a plurality of frames adjacent to the frame of image, as shown in FIG. 6d, and the electronic device may further display an effect of the image corresponding to the frame on a display screen after enhancement. Further, after enhancement of the video is completed, as shown in FIG. 6e, the enhanced video can be obtained, and the video can be played. Optionally, operations such as downloading and sharing may further be performed on the processed video. For example, in actual application scenarios, videos or images in Tencent Video and Weishi can be enhanced.

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

Figure 7:
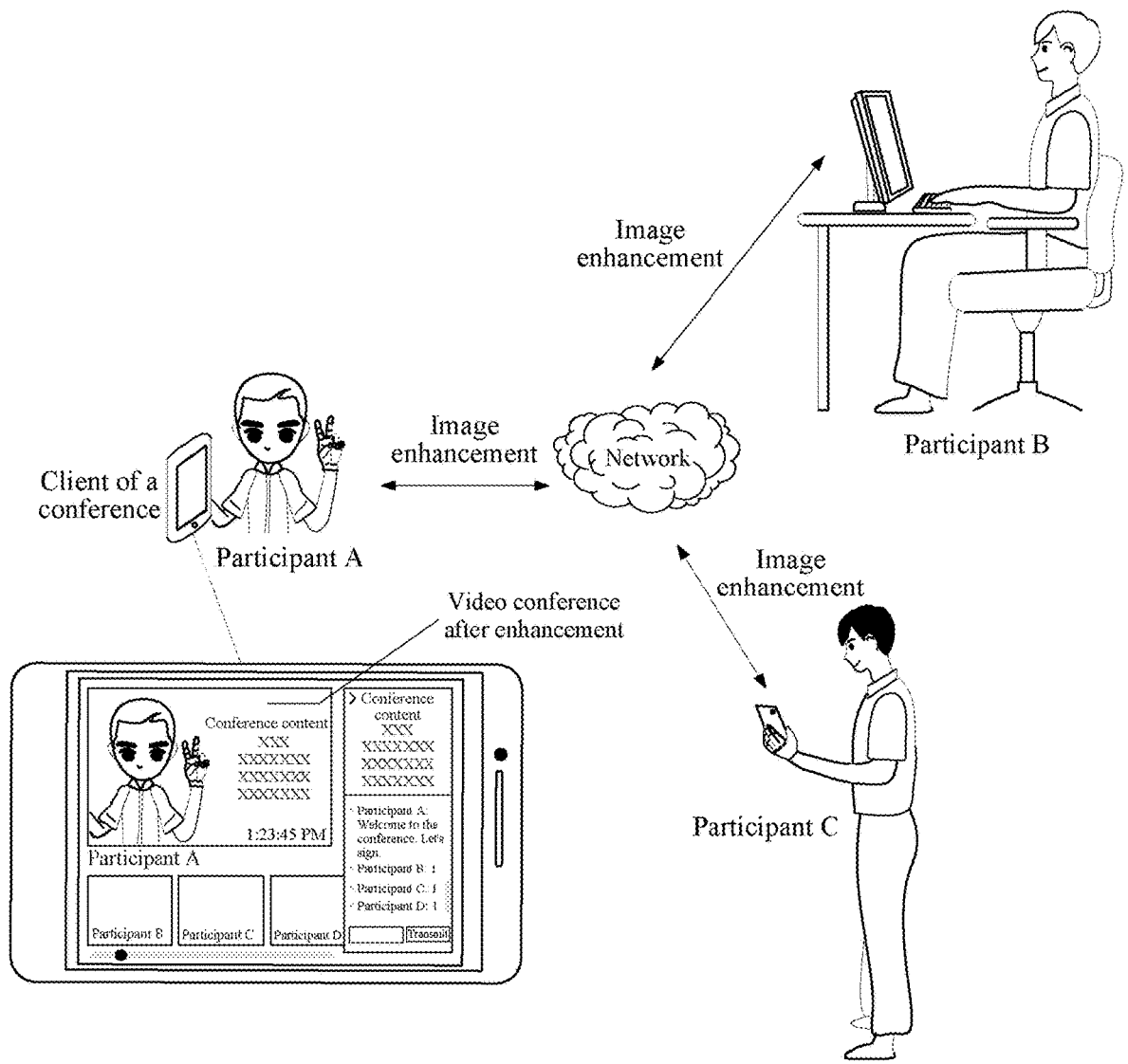
FIG. 7 is a diagram of another application scenario of an image enhancement method according to an embodiment of this disclosure.
Figure 8:
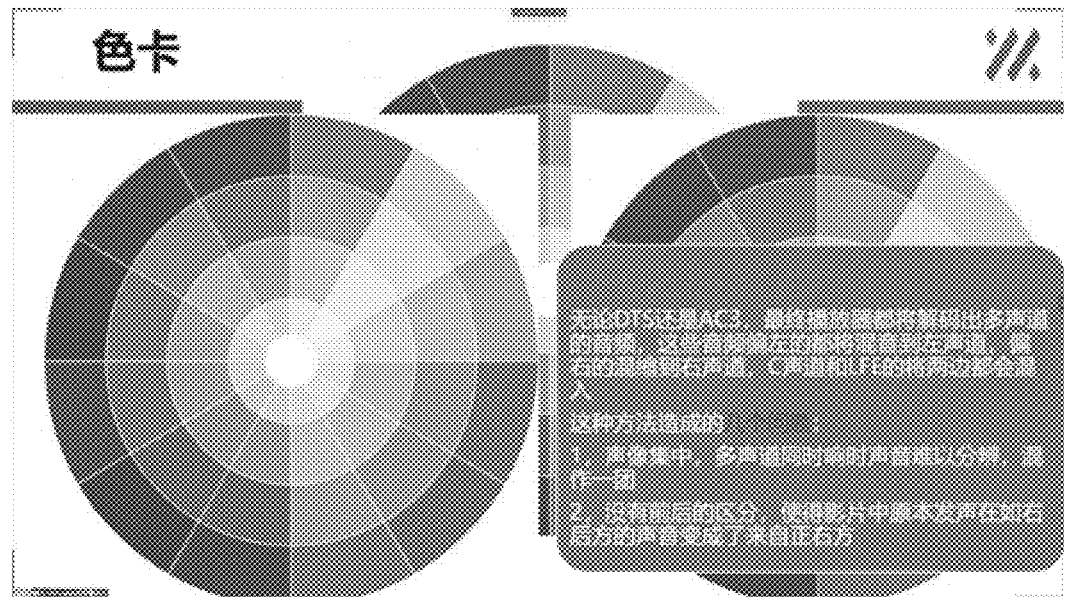
FIG. 8 is a schematic diagram of effect comparison of meeting-detail image enhancement according to an embodiment of this disclosure.
Figure 8:
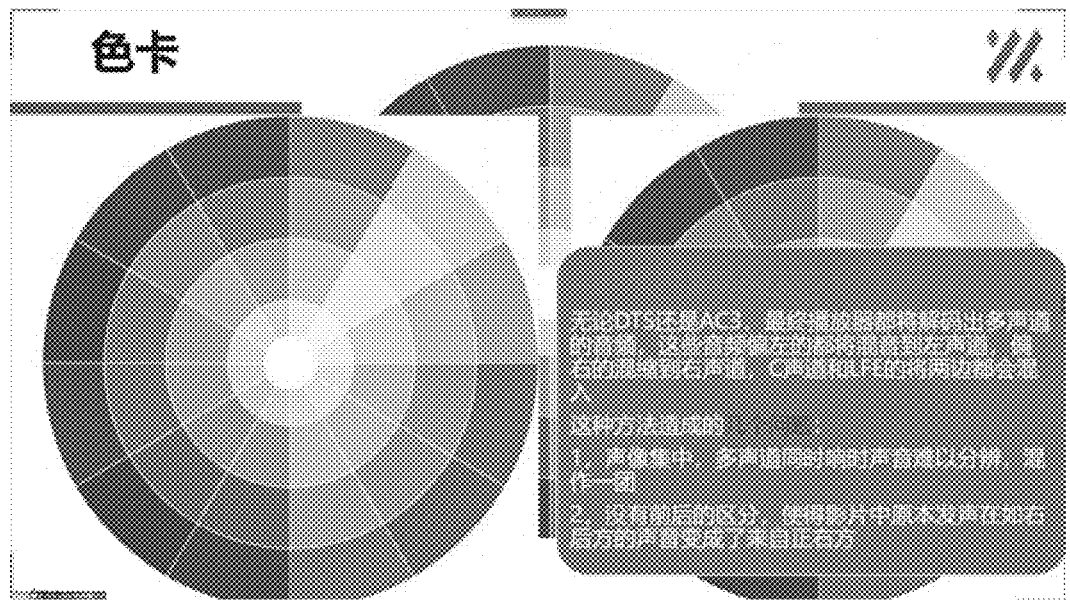

FIG. 7 is a diagram of another application scenario of an image enhancement method according to an embodiment of this disclosure. As shown in FIG. 7, in a video conference scenario, when there are a plurality of participants, each participant performs real-time video transmission by using the Internet. An electronic device corresponding to the participant may be used as a sender of a video or a receiver of a video. Frames included in an acquired video may be enhanced before the video is transmitted to another participant. Alternatively, after a video transmitted by another participant is received, images included in the received video may be enhanced. As shown in FIG. 7, a client to join the video conference may be installed on the electronic device corresponding to each participant. The client may be a web client, an application client, an applet client, or the like. Video information of the plurality of participants may be displayed in the client of the video conference. A video of a presenter or a current speaker in the participants may be in a large size, and videos of other participants may be in a small size. The video client may further include main content of the conference and text communication content. A video of a participant may be a video delivered by the participant or content shared on a screen, and a picture is enhanced during screen sharing or a video call, which can improve viewing experience of a user. FIG. 8 is a schematic diagram of effect comparison of image enhancement of meeting details according to this disclosure. As shown in FIG. 8, the content in the figure is content shared on a screen during a meeting, an image above is a to-be-enhanced image, and an image below is an image with enhanced and corrected details.

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

Figure 9A:
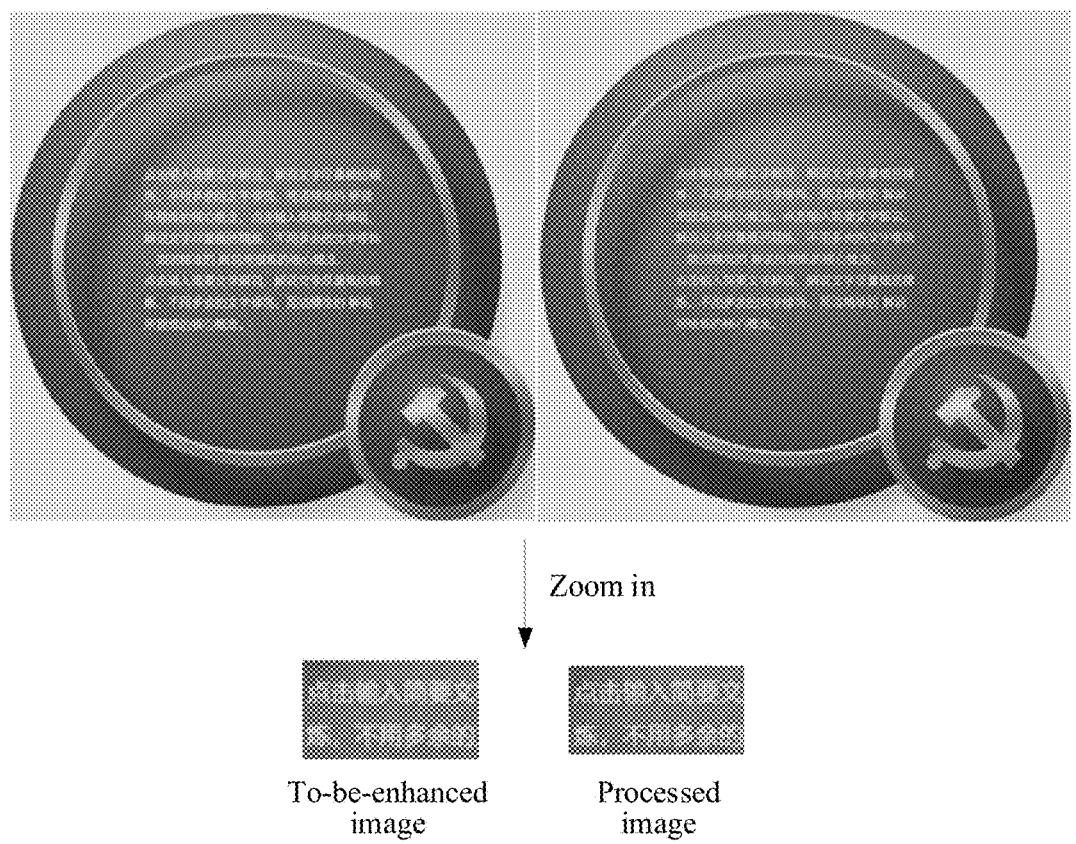
FIG. 9a is a schematic diagram of overall effect comparison of another image enhancement according to an embodiment of this disclosure.
Figure 9B:
FIG. 9b is a schematic diagram of overall effect comparison of another image enhancement according to an embodiment of this disclosure.
Figure 9B:
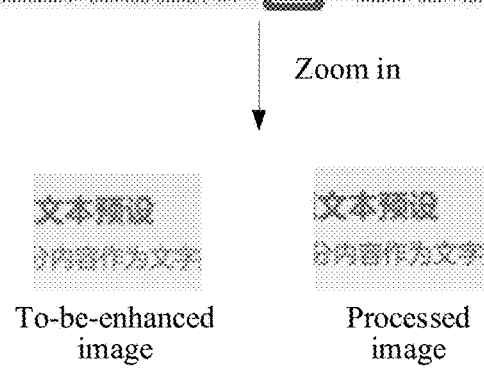

FIG. 9a and FIG. 9b are schematic diagrams of another overall effect comparison of image enhancement according to the embodiments of this disclosure. As shown in FIG. 9a, an overall enhancement effect of an image is shown in a right image in the upper half of FIG. 9a. In order to more intuitively observe an effect of the image enhancement method of this disclosure, text parts in a to-be-enhanced image (left) and a processed image (right) are enlarged respectively. It can be seen from the enlarged images that, through the solutions provided by this disclosure, aliasing is not introduced in a case of enhancing image details, so that text included in an enhanced image is more clear and legible. Images shown in the upper half of FIG. 9b are also two images including a lot of text. In order to better observe an enhancement effect, the image before processing (left) and the image after processing (right) are respectively enlarged as shown in the lower half of FIG. 9b, and an enhancement effect of a text part can be clearly seen, which improves the recognition and definition of the text.

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

Figure 10:
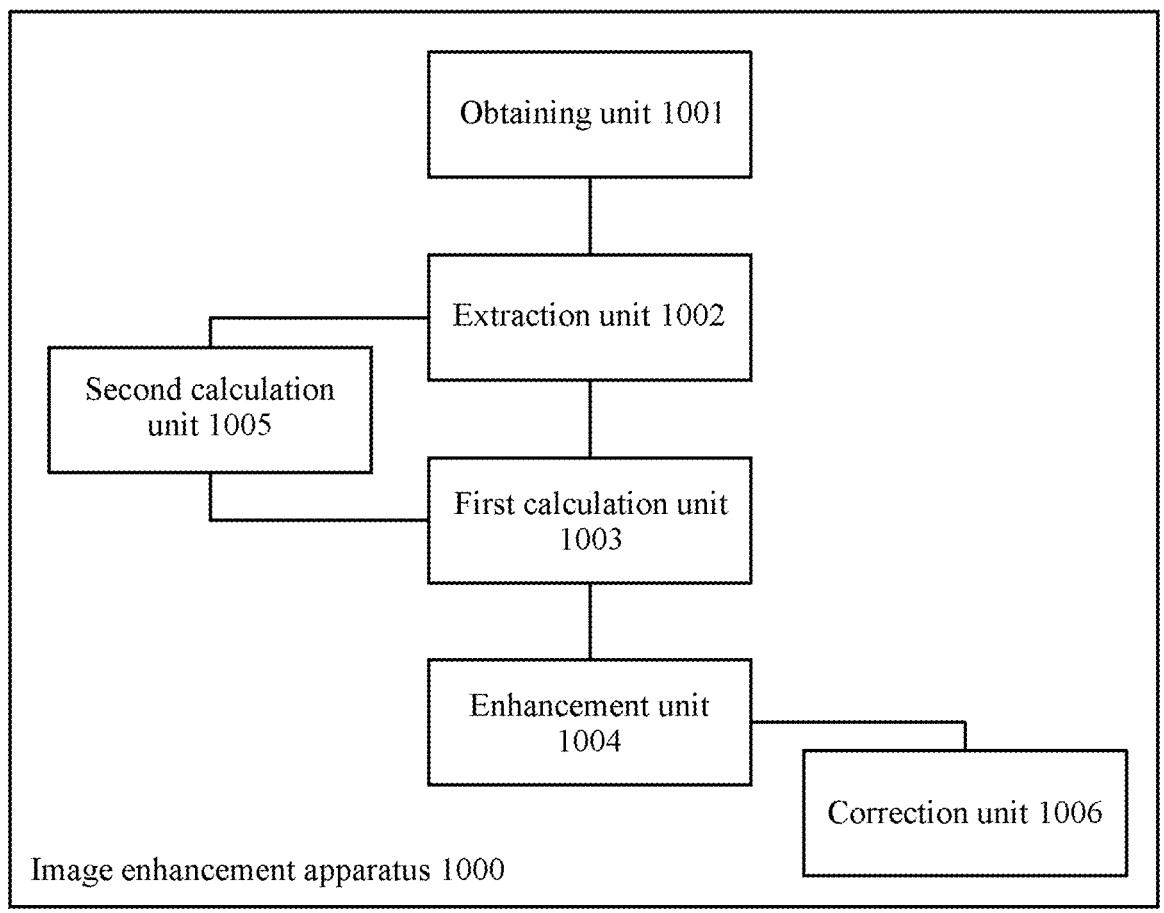
FIG. 10 is a schematic structural diagram of an image enhancement apparatus according to an embodiment of this disclosure.

FIG. 10 is a schematic structural diagram of an image enhancement apparatus 1000 according to an embodiment of this disclosure. The image enhancement apparatus 1000 provided in this embodiment of this disclosure may be various electronic devices, and the image enhancement apparatus 1000 includes an obtaining unit 1001, an extraction unit 1002, a first calculation unit 1003, and an enhancement unit 1004. One or more units of the apparatus can be implemented by processing circuitry, software, or a combination thereof, for example.

The obtaining unit 1001 is configured to obtain a to-be-enhanced image.

The extraction unit 1002 is configured to extract high-frequency components of the image.

The first calculation unit 1003 is configured to calculate an average pixel value of pixels corresponding to the high-frequency components.

The enhancement unit 1004 is configured to perform enhancement on pixels with pixel values greater than or equal to the average pixel value in the image to obtain an enhanced image.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In one implementation, the extraction unit 1002 is specifically configured to: (1) perform smooth filtering on the image; and (2) calculate differences between pixel values of pixels corresponding to the image and pixel values of pixels corresponding to an image after smooth filtering to obtain the high-frequency components of the image.

In one implementation, the performing smooth filtering on the image includes: (1) respectively reading weights in a filter convolution kernel by using SIMD, and multiplying each of the weights by pixel values of N consecutive pixels starting from a pixel corresponding to the weight in the image to obtain N multiplication results, N being an integer greater than one; and (2) calculating convolution results of N consecutive pixels starting from a pixel corresponding to a center of the convolution kernel in the image according to multiplication results calculated through each weight in the filter convolution kernel.

In one implementation, the filter convolution kernel is a Gaussian convolution kernel, and before the multiplying each of the weights by pixel values of N consecutive pixels starting from a pixel corresponding to the weight in the image, the extraction unit is further configured to: (1) perform a multiplication operation on a particular weight in the Gaussian convolution kernel and $2^n$, to quantify the particular weight in the Gaussian convolution kernel, n being an integer; and (2) perform a division operation on the convolution results of the N consecutive pixels after the convolution results of the N consecutive pixels are obtained, the multiplication operation and the division operation referring to shift operations in binary operations.

In one implementation, the apparatus 1000 further includes a second calculation unit 1005.

The second calculation unit 1005 is configured to calculate absolute values of the high-frequency components to obtain absolute high-frequency components.

When calculating the average pixel value of the pixels corresponding to the high-frequency components, the first calculation unit 1003 is further configured to calculate the average pixel value according to the absolute high-frequency components and a quantity of pixels corresponding to the absolute high-frequency components.

In one implementation, the calculating the average pixel value according to the absolute high-frequency components and a quantity of pixels corresponding to the absolute high-frequency components includes calculating an average value of absolute high-frequency components greater than 0 in the absolute high-frequency components as the average pixel value.

In one implementation, the apparatus 1000 further includes a correction unit 1006.

The correction unit 1006 is configured to correct a pixel value of an enhanced pixel that is in the image and that corresponds to a first pixel, the first pixel being a pixel in the pixels corresponding to the high-frequency components.

In one implementation, the correction unit 1006 is further configured to (1) obtain a correction coefficient; (2) calculate a correction threshold according to the correction coefficient and the average pixel value; and (3) perform, in a case that a pixel value of the first pixel is greater than the correction threshold, the correcting a pixel value of an enhanced pixel that is in the image and that corresponds to a first pixel.

In one implementation, the correction unit 1006 is further configured to restore the pixel value of the enhanced pixel that is in the image and that corresponds to the first pixel to a value before enhancement.

In one implementation, the enhancement unit 1004 is further configured to: (1) obtain an enhancement coefficient; (2) calculate a pixel value of an enhanced second pixel according to the enhancement coefficient in a case that an absolute high-frequency component corresponding to the second pixel is greater than or equal to the average pixel value, the second pixel being any one of the pixels corresponding to the high-frequency components; (3) determine a first threshold as the pixel value of the enhanced second pixel in a case that the calculated pixel value of the second pixel is greater than the first threshold; (4) determine a second threshold as the pixel value of the enhanced second pixel in a case that the calculated pixel value of the second pixel is less than the second threshold, the second threshold being less than the first threshold; (5) determine the calculated pixel value of the second pixel as the pixel value of the enhanced second pixel in a case that the calculated pixel value of the second pixel is greater than or equal to the second threshold and less than or equal to the first threshold; and (6) replace the pixel value of the second pixel in the image with the pixel value of the enhanced second pixel to obtain the enhanced image.

In one implementation, the enhancement unit 1004 is further configured to: (1) obtain an enhancement coefficient; (2) calculate, according to the enhancement coefficient in a case that an absolute high-frequency component corresponding to a second pixel is greater than or equal to the average pixel value, a pixel value of an enhanced pixel that corresponds to the second pixel and that is in the image, the second pixel being any one of the pixels corresponding to the high-frequency components; (3) determine a first threshold as the pixel value of the enhanced pixel in a case that the calculated pixel value of the enhanced pixel is greater than or equal to the first threshold; (4) determine a second threshold as the pixel value of the enhanced pixel in a case that the calculated pixel value of the enhanced pixel is less than the second threshold, the second threshold being less than the first threshold; and (5) determine the calculated pixel value of the enhanced pixel as the pixel value of the enhanced pixel in a case that the calculated pixel value of the enhanced pixel is greater than or equal to the second threshold and less than the first threshold.

The calculating, according to the enhancement coefficient, a pixel value of an enhanced pixel that corresponds to the second pixel and that is in the image includes adding a product of the enhancement coefficient and a pixel value of the second pixel to an original pixel value of the pixel in the image to obtain the pixel value of the enhanced pixel in the image.

For detailed descriptions of the obtaining unit 1001, the extraction unit 1002, the first calculation unit 1003, the enhancement unit 1004, the second calculation unit 1005, and the correction unit 1006, reference may be made to relevant descriptions in the method embodiments shown in FIG. 2 to FIG. 9b. Details are not described herein again.

The image enhancement apparatus in the embodiments of this disclosure extracts, when obtaining a to-be-enhanced image, high-frequency components of the image, calculates an average pixel value of pixels corresponding to the high-frequency components according to the extracted high-frequency components, and performs enhancement on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

Figure 11:
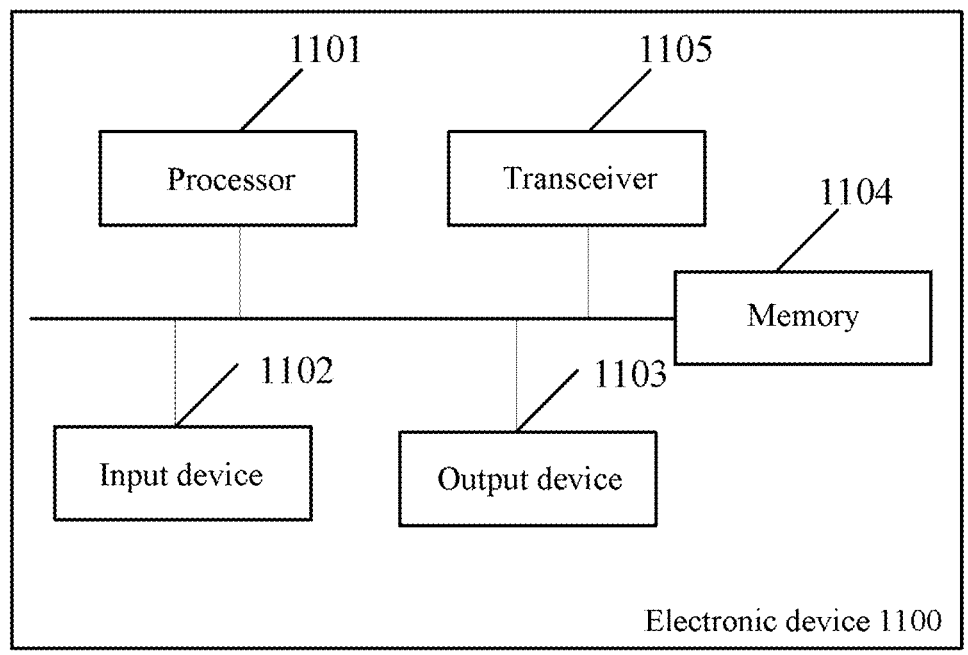
FIG. 11 is a schematic structural diagram of an electronic device according to an embodiment of this disclosure.

FIG. 11 is a schematic structural diagram of an electronic device according to an embodiment of this disclosure. As shown in FIG. 11, the electronic device 1100 may include one or more processors (processing circuitry) 1101, an input device 1102, an output device 1103, a memory 1104, and a transceiver 1105. Each of the one or more processors (processing circuitry) 1101, the input device 1102, the output device 1103, the memory 1104, and the transceiver 1105 are connected through a bus. The input device 1102 may include a touch screen, a keyboard, a microphone, or the like. The output device 1103 may include a display screen, sound equipment, or the like. The transceiver 1105 is configured to receive and transmit data. The memory 1104 is configured to store a computer program. The computer program includes program instructions. The one or more processors 1101 (processing circuitry) are configured to execute the program instructions stored in the memory 1104. The one or more processors 1101 are configured to invoke the program instructions to perform the following steps: (1) obtaining a to-be-enhanced image; (2) extracting high-frequency components of the image; (3) calculating an average pixel value of pixels corresponding to the high-frequency components; and (4) performing enhancement on pixels with pixel values greater than or equal to the average pixel value in the image to obtain an enhanced image.

In one implementation, the processor 1101 (processing circuitry) extracts the high-frequency components of the image by: (1) performing smooth filtering on the image; and (2) calculating differences between pixel values of pixels corresponding to the image and pixel values of pixels corresponding to an image after smooth filtering to obtain the high-frequency components of the image.

In one implementation, the processor 1101 (processing circuitry) performs smooth filtering on the image, which includes: (1) respectively reading weights in a filter convolution kernel by using SIMD, and multiplying each of the weights by pixel values of N consecutive pixels starting from a pixel corresponding to the weight in the image to obtain N multiplication results, N being an integer greater than one; and (2) calculating convolution results of N consecutive pixels starting from a pixel corresponding to a center of the convolution kernel in the image according to multiplication results calculated through each weight in the filter convolution kernel.

In one implementation, the filter convolution kernel is a Gaussian convolution kernel, and before the multiplying each of the weights by pixel values of N consecutive pixels starting from a pixel corresponding to the weight in the image, the processor 1101 is further configured to: (1) perform a multiplication operation on a weight in the Gaussian convolution kernel and $2^n$, to quantify the weight in the Gaussian convolution kernel, n being an integer; and (2) perform a division operation on the convolution results of the N consecutive pixels after the convolution results of the N consecutive pixels are obtained, the multiplication operation and the division operation referring to shift operations in binary operations.

In one implementation, the processor 1101 (processing circuitry) is configured to invoke the program instructions to perform: calculating absolute values of the high-frequency components to obtain absolute high-frequency components; and the calculating an average pixel value of pixels corresponding to the high-frequency components includes calculating the average pixel value according to the absolute high-frequency components and a quantity of pixels corresponding to the absolute high-frequency components.

In one implementation, the processor 1101 (processing circuitry) calculates the average pixel value according to the absolute high-frequency components and a quantity of pixels corresponding to the absolute high-frequency components includes calculating an average value of absolute high-frequency components greater than 0 in the absolute high-frequency components as the average pixel value.

In one implementation, after the processor 1101 (processing circuitry) performs enhancement on the pixels with pixel values greater than or equal to the average pixel value in the image to obtain the enhanced image, the processor 1101 is configured to invoke the program instructions to perform correcting a pixel value of an enhanced pixel that is in the image and that corresponds to a first pixel, the first pixel being a pixel in the pixels corresponding to the high-frequency components.

In one implementation, the correcting a pixel value of an enhanced pixel that is in the image and that corresponds to a first pixel includes: (1) obtaining a correction coefficient; (2) calculating a correction threshold according to the correction coefficient and the average pixel value; and (3) performing, in a case that a pixel value of the first pixel is greater than the correction threshold, the correcting a pixel value of an enhanced pixel that is in the image and that corresponds to a first pixel.

In one implementation, the processor 1101 (processing circuitry) corrects the pixel value of the enhanced pixel that is in the image and that corresponds to the first pixel and includes restoring the pixel value of the enhanced pixel that is in the image and that corresponds to the first pixel to a value before enhancement.

In one implementation, the processor 1101 (processing circuitry) performs enhancement on the pixels with pixel values greater than or equal to the average pixel value in the image to obtain the enhanced image and includes: (1) obtaining an enhancement coefficient; (2) calculating a pixel value of an enhanced second pixel according to the enhancement coefficient when an absolute high-frequency component corresponding to the second pixel is greater than or equal to the average pixel value, the second pixel being any one of the pixels corresponding to the high-frequency components; (3) determining a first threshold as the pixel value of the enhanced second pixel when the calculated pixel value of the second pixel is greater than the first threshold; (4) determining a second threshold as the pixel value of the enhanced second pixel when the calculated pixel value of the second pixel is less than the second threshold, the second threshold being less than the first threshold; (5) determining the calculated pixel value of the second pixel as the pixel value of the enhanced second pixel when the calculated pixel value of the second pixel is greater than or equal to the second threshold and less than or equal to the first threshold; and (6) replacing the pixel value of the second pixel in the image with the pixel value of the enhanced second pixel to obtain the enhanced image.

In one implementation, the processor 1101 (processing circuitry) performs enhancement on the pixels with pixel values greater than or equal to the average pixel value in the image to obtain the enhanced image, which includes: (1) obtaining an enhancement coefficient; (2) calculating, according to the enhancement coefficient when an absolute high-frequency component corresponding to a second pixel is greater than or equal to the average pixel value, a pixel value of an enhanced pixel that corresponds to the second pixel and that is in the image, the second pixel being any one of the pixels corresponding to the high-frequency components; (3) determining a first threshold as the pixel value of the enhanced pixel when the calculated pixel value of the enhanced pixel is greater than or equal to the first threshold; (4) determining a second threshold as the pixel value of the enhanced pixel when the calculated pixel value of the enhanced pixel is less than the second threshold, the second threshold being less than the first threshold; and (5) determining the calculated pixel value of the enhanced pixel as the pixel value of the enhanced pixel when the calculated pixel value of the enhanced pixel is greater than or equal to the second threshold and less than the first threshold.

Further, the calculating, according to the enhancement coefficient, a pixel value of an enhanced pixel that corresponds to the second pixel and that is in the image includes adding a product of the enhancement coefficient and a pixel value of the second pixel to an original pixel value of the pixel in the image to obtain the pixel value of the enhanced pixel in the image.

It is to be understood that in some feasible implementations, the processor 1101 may be a central processing unit (CPU), an example of processing circuitry. The processor 1101 may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any processor.

The memory 1104 may include a read-only memory (ROM) and a random access memory (RAM), and provide the instructions and data to the processor. A part of the memory 1104 may further include a non-volatile random access memory.

In specific implementation, the electronic device 1100 may perform the implementations provided in the steps in FIG. 1 to FIG. 9b through built-in functional modules of the electronic device. For details, reference may be made to the implementations provided in the foregoing steps, and details are not described herein again.

In the embodiments of this disclosure, when a to-be-enhanced image is obtained, high-frequency components of the image are extracted. An average pixel value of pixels corresponding to the high-frequency components is calculated according to the extracted high-frequency components. Enhancement is performed on pixels with pixel values greater than or equal to the average pixel value in the image to obtain an enhanced image. It can be seen that, in the image enhancement method of this disclosure, through extracting the high-frequency components in the image, an adaptive enhancement threshold corresponding to the image is calculated according to the high-frequency components and is used for determining details of the image that need to be enhanced, and the details are enhanced to obtain the enhanced image. The image enhancement method provided by this disclosure can improve the overall picture definition of the image by enhancing the details of the image, thereby improving an image enhancement effect.

In addition, this disclosure further provides a non-transitory computer-readable storage medium. The computer-readable storage medium stores a computer program executed by the electronic device mentioned above, and the computer program includes program instructions. When executing the program instructions, the processor (processing circuitry) can implement the descriptions of the image enhancement method in the embodiments corresponding to FIG. 2 to FIG. 9b. Therefore, details are not described herein again. In addition, the description of beneficial effects of the same method is not described herein again. For technical details that are not disclosed in the computer storage medium embodiments of this disclosure, refer to the descriptions of the method embodiments of this disclosure.

An embodiment of this disclosure provides a computer program product or a computer program. The computer program product or the computer program includes computer instructions, the computer instructions being stored in a computer-readable storage medium. A processor of a computer device reads the computer instructions from the computer-readable storage medium, and executes the computer instructions, so that the computer device performs the image enhancement method provided in the various optional implementations.

In the claims, specification, and accompanying drawings of this disclosure, the terms "first," "second," or the like are intended to distinguish between different objects but do not indicate a particular order. In addition, the terms "include," "have," and any variant thereof are intended to cover a non-exclusive inclusion. For example, a process, method, system, product, or device that includes a series of steps or units is not limited to the listed steps or units; and instead, further optionally includes a step or unit that is not listed, or further optionally includes another step or unit that is intrinsic to the process, method, product, or device. "Embodiment" mentioned in the disclosure means that particular features, structures, or characteristics described with reference to the embodiment may be included in at least one embodiment of this disclosure. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments. A term "and/or" used in this disclosure and the appended claims refers to one or more of any and all possible combinations of the associated items that is listed and includes the combinations.

A person of ordinary skill in the art may be aware that the units and steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Those skilled in the art may use different methods to implement the described functions for each particular application, but such implementation is not to be considered beyond the scope of this disclosure.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

The invention claimed is:

1. An image enhancement method, comprising:
obtaining an image;
extracting high-frequency components of the image;
calculating an average pixel value of pixels corresponding to the extracted high-frequency components;
performing enhancement on pixels in the image that have pixel values greater than or equal to the calculated average pixel value to obtain an enhanced image;
obtaining a correction coefficient;

calculating a correction threshold according to the obtained correction coefficient and the average pixel value; and correcting a pixel value of an enhanced pixel that is in the enhanced image and that corresponds to a first pixel when the pixel value of the first pixel is greater than the calculated correction threshold, the first pixel being a pixel in the pixels corresponding to the high-frequency components.

2. The method according to claim 1, wherein the extracting the high-frequency components of the image further comprises:

performing smooth filtering on the image to obtain a smoothed image; and calculating differences between pixel values of pixels corresponding to the image and pixel values of pixels corresponding to the smoothed image to obtain the high-frequency components of the image.

3. The method according to claim 2, wherein the performing the smooth filtering on the image comprises:

respectively reading weights in a filter convolution kernel by using single instruction multiple data (SIMD), and multiplying each weight of the weights by pixel values of N consecutive pixels starting from a pixel corresponding to the weight in the image to obtain N multiplication results, N being an integer greater than one; and calculating convolution results of N consecutive pixels starting from a pixel corresponding to a center of the convolution kernel in the image according to multiplication results calculated through each weight in the filter convolution kernel.

4. The method according to claim 3, wherein the filter convolution kernel is a Gaussian convolution kernel, and before the multiplying each weight of the weights by pixel values of N consecutive pixels, the method further comprises:

performing a multiplication operation on a particular weight in the Gaussian convolution kernel and $2^n$, to quantify the particular weight in the Gaussian convolution kernel, n being an integer; and performing a division operation on the convolution results of the N consecutive pixels after the convolution results of the N consecutive pixels are obtained, the multiplication operation and the division operation referring to shift operations in binary operations.

5. The method according to claim 2, further comprising calculating absolute values of the high-frequency components to obtain absolute high-frequency components, wherein the calculating the average pixel value of the pixels corresponding to the extracted high-frequency components further comprises calculating the average pixel value according to the absolute high-frequency components and a quantity of pixels corresponding to the absolute high-frequency components.

6. The method according to claim 5, wherein the calculating the average pixel value according to the absolute high-frequency components and the quantity of pixels corresponding to the absolute high-frequency components further comprises:

calculating an average value of absolute high-frequency components greater than zero in the absolute high-frequency components as the average pixel value.

7. The method according to claim 1, wherein the correcting further comprises restoring the pixel value of the enhanced pixel that is in the enhanced image and that corresponds to the first pixel to a value before enhancement.

8. The method according to claim 5, wherein the performing the enhancement on the pixels in the image that have pixel values greater than or equal to the average pixel value further comprises:

obtaining an enhancement coefficient;

calculating a pixel value of an enhanced second pixel according to the obtained enhancement coefficient when an absolute high-frequency component corresponding to the second pixel is greater than or equal to the average pixel value, the second pixel being any one of the pixels corresponding to the high-frequency components;

determining a first threshold as the pixel value of the enhanced second pixel when the calculated pixel value of the second pixel is greater than the first threshold;

determining a second threshold as the pixel value of the enhanced second pixel when the calculated pixel value of the second pixel is less than the second threshold, the second threshold being less than the first threshold;

determining the calculated pixel value of the second pixel as the pixel value of the enhanced second pixel when the calculated pixel value of the second pixel is greater than or equal to the second threshold and less than or equal to the first threshold; and replacing the pixel value of the second pixel in the image with the pixel value of the enhanced second pixel to obtain the enhanced image.

9. The method according to claim 5, wherein the performing the enhancement on the pixels in the image that have pixel values greater than or equal to the average pixel value further comprises:

obtaining an enhancement coefficient;

calculating, according to the obtained enhancement coefficient when an absolute high-frequency component corresponding to a second pixel is greater than or equal to the average pixel value, a pixel value of an enhanced pixel that corresponds to the second pixel and that is in the image, the second pixel being any one of the pixels corresponding to the high-frequency components;

determining a first threshold as the pixel value of the enhanced pixel when the calculated pixel value of the enhanced pixel is greater than or equal to the first threshold;

determining a second threshold as the pixel value of the enhanced pixel when the calculated pixel value of the enhanced pixel is less than the second threshold, the second threshold being less than the first threshold; and determining the calculated pixel value of the enhanced pixel as the pixel value of the enhanced pixel when the calculated pixel value of the enhanced pixel is greater than or equal to the second threshold and less than the first threshold.

10. The method according to claim 9, wherein the calculating, according to the enhancement coefficient, the pixel value of the enhanced pixel that corresponds to the second pixel further comprises:

adding a product of the enhancement coefficient and a pixel value of the second pixel to an original pixel value of the pixel in the image to obtain the pixel value of the enhanced pixel in the image.

11. An image enhancement apparatus, comprising:
processing circuitry configured to
obtain an image;
extract high-frequency components of the image;
calculate an average pixel value of pixels corresponding to the extracted high-frequency components;

perform enhancement on pixels in the image that are determined to be enhanced to obtain an enhanced image;

obtain a correction coefficient;

calculate a correction threshold according to the obtained correction coefficient and the average pixel value; and correct a pixel value of an enhanced pixel that is in the enhanced image and that corresponds to a first pixel when the pixel value of the first pixel is greater than the calculated correction threshold, the first pixel being a pixel in the pixels corresponding to the high-frequency components.

12. An electronic device, comprising processing circuitry and a memory, the processing circuitry being connected to the memory, the memory being configured to store program code, and the processing circuitry being configured to invoke the program code, to perform the method according to claim 1.

13. A non-transitory computer-readable storage medium, storing one or more first instructions, the one or more first instructions that when executed by processing circuitry cause the processing circuitry to perform:

obtaining an image;

extracting high-frequency components of the image;

calculating an average pixel value of pixels corresponding to the extracted high-frequency components;

performing enhancement on pixels in the image that have pixel values greater than or equal to the calculated average pixel value to obtain an enhanced image;

obtaining a correction coefficient;

calculating a correction threshold according to the obtained correction coefficient and the average pixel value; and correcting a pixel value of an enhanced pixel that is in the enhanced image and that corresponds to a first pixel when the pixel value of the first pixel is greater than the calculated correction threshold, the first pixel being a pixel in the pixels corresponding to the high-frequency components.

14. The apparatus of claim 11, wherein the processing circuitry is further configured to, in extracting the high-frequency components of the image:

perform smooth filtering on the image to obtain a smoothed image; and calculate differences between pixel values of pixels corresponding to the image and pixel values of pixels corresponding to the smoothed image to obtain the high-frequency components of the image.

15. The apparatus of claim 14, wherein the processing circuitry is further configured to, in performing the smooth filtering on the image:

respectively read weights in a filter convolution kernel by using single instruction multiple data (SIMD), and multiply each weight of the weights by pixel values of N consecutive pixels starting from a pixel corresponding to the weight in the image to obtain N multiplication results, N being an integer greater than one; and calculate convolution results of N consecutive pixels starting from a pixel corresponding to a center of the convolution kernel in the image according to multiplication results calculated through each weight in the filter convolution kernel.

16. The apparatus of claim 15, wherein the filter convolution kernel is a Gaussian convolution kernel, and before the multiply each weight of the weights by pixel values of N consecutive pixels, the processing circuitry is further configured to:

perform a multiplication operation on a particular weight in the Gaussian convolution kernel and $2^n$, to quantify the particular weight in the Gaussian convolution kernel, n being an integer; and perform a division operation on the convolution results of the N consecutive pixels after the convolution results of the N consecutive pixels are obtained, the multiplication operation and the division operation referring to shift operations in binary operations.

17. The apparatus of claim 14, wherein the processing circuitry is further configured to calculate absolute values of the high-frequency components to obtain absolute high-frequency components, wherein, in calculating the average pixel value of the pixels corresponding to the extracted high-frequency components, the processing circuitry is further configured to calculate the average pixel value according to the absolute high-frequency components and a quantity of pixels corresponding to the absolute high-frequency components.

18. The apparatus of claim 17, wherein, in calculating the average pixel value according to the absolute high-frequency components and the quantity of pixels corresponding to the absolute high-frequency components, the processing circuitry is further configured to:

calculate an average value of absolute high-frequency components greater than zero in the absolute high-frequency components as the average pixel value.

19. The method according to claim 2, wherein the performing the smooth filtering comprises:

performing a multiplication operation on a particular weight in a filter convolution kernel and $2^n$, to quantify the particular weight in the filter convolution kernel, n being an integer; and performing a division operation on convolution results of N consecutive pixels after the convolution results of the N consecutive pixels are obtained, the multiplication operation and the division operation referring to shift operations in binary operations.

20. The apparatus according to claim 11, wherein the processing circuitry is configured to:

perform a multiplication operation on a particular weight in a filter convolution kernel and $2^n$, to quantify the particular weight in the filter convolution kernel, n being an integer; and perform a division operation on convolution results of N consecutive pixels after the convolution results of the N consecutive pixels are obtained, the multiplication operation and the division operation referring to shift operations in binary operations.

* * * * *

UNITED STATES PATENT AND TRADEMARK OFFICE
CERTIFICATE OF CORRECTION

PATENT NO. : 12,094,088 B2
APPLICATION NO. : 17/452679
DATED : September 17, 2024
INVENTOR(S) : Zhihuai Xie et al.

It is certified that error appears in the above-identified patent and that said Letters Patent is hereby corrected as shown below:

On the Title Page

Item (71), the Applicant city reads as:
Guangdong (CN)
Should read as:
--Shenzhen (CN)--

Item (72), the First and Third Inventors city reads as:
Guangdong (CN)
Should read as:
--Shenzhen (CN)--

Item (73), the Assignee city reads as:
Guangdong (CN)
Should read as:
--Shenzhen (CN)--

Signed and Sealed this
Fifth Day of November, 2024

Katherine Kelly Vidal
*Director of the United States Patent and Trademark Office*